(12) United States Patent
Beckstrom et al.

(10) Patent No.: US 7,236,583 B2
(45) Date of Patent: Jun. 26, 2007

(54) SYSTEM AND METHOD FOR OPTIMIZING CALL ROUTING TO AN AGENT

(75) Inventors: Robert P. Beckstrom, Bolingbrook, IL (US); Eric James, Elgin, IL (US)

(73) Assignee: Rockwell Electronic Commerce Technologies, LLC, Wood Dale, IL (US)

( * ) Notice: Subject to any disclaimer, the term of this patent is extended or adjusted under 35 U.S.C. 154(b) by 975 days.

(21) Appl. No.: 10/442,000

(22) Filed: May 20, 2003

(65) Prior Publication Data

US 2004/0234066 A1 Nov. 25, 2004

(51) Int. Cl.
*H04M 3/00* (2006.01)

(52) U.S. Cl. .............................. 379/265.1; 379/266.07; 379/266.08

(58) Field of Classification Search ........... 379/265.02, 379/265.05, 265.08, 265.1, 266.07, 266.08
See application file for complete search history.

(56) References Cited

U.S. PATENT DOCUMENTS

| | | | |
|---|---|---|---|
| 5,127,004 A | 6/1992 | Lenihan et al. | |
| 5,140,611 A | 8/1992 | Jones et al. | |
| 5,268,903 A | 12/1993 | Jones et al. | |
| 5,327,490 A | 7/1994 | Cave | |
| 5,555,179 A | 9/1996 | Koyama et al. | |
| 5,765,033 A | 6/1998 | Miloslavsky | |
| 5,926,539 A | 7/1999 | Shtivelman | |
| 5,946,387 A | 8/1999 | Miloslavsky | |
| 5,953,332 A | 9/1999 | Miloslavsky | |
| 5,953,405 A | 9/1999 | Miloslavsky | |
| RE36,416 E | * 11/1999 | Szlam et al. | ............. 379/88.09 |
| 5,999,617 A | 12/1999 | Oyanagi et al. | |
| 6,002,760 A | 12/1999 | Gisby | |
| 6,021,428 A | 2/2000 | Miloslavsky | |
| 6,044,145 A | 3/2000 | Kelly et al. | |
| 6,044,368 A | 3/2000 | Powers | |
| 6,067,357 A | 5/2000 | Kishinsky et al. | |
| 6,097,806 A | 8/2000 | Baker et al. | |
| 6,108,711 A | 8/2000 | Beck et al. | |
| 6,138,139 A | 10/2000 | Beck et al. | |
| 6,167,395 A | 12/2000 | Beck et al. | |
| 6,170,011 B1 | 1/2001 | Beck et al. | |

(Continued)

FOREIGN PATENT DOCUMENTS

| | | |
|---|---|---|
| EP | 0 551 715 A3 | 7/1993 |
| EP | 1 345 398 A1 | 9/2003 |

*Primary Examiner*—Bing Q. Bui
(74) *Attorney, Agent, or Firm*—Welsh & Katz, Ltd.

(57) ABSTRACT

A method for optimizing a workload of an agent of the transaction processing system is disclosed, where the agent handles inbound and outbound calls and the calls are based on voice-dialog communication and/or text-dialog communication. The method includes obtaining historical data from a database based on a category of a current call handled by the agent, where the historical data provides an indication of an expected duration of the call. The method also includes determining a predicted end time of the current call. If an inbound call is pending, the inbound call is routed to the agent after the current call terminates. If an inbound call is not pending, then an outbound call number is obtained from a list of outbound call numbers to be placed, the outbound call is placed a determined amount of time prior to the predicted end time of the current call, and the outbound call is routed to the agent.

32 Claims, 3 Drawing Sheets

U.S. PATENT DOCUMENTS

| | | |
|---|---|---|
| 6,175,563 B1 | 1/2001 | Miloslavsky |
| 6,175,564 B1 | 1/2001 | Miloslavsky et al. |
| 6,185,292 B1 | 2/2001 | Miloslavsky |
| 6,289,373 B1 | 9/2001 | Dezonno |
| 6,345,305 B1 | 2/2002 | Beck et al. |
| 6,373,836 B1 | 4/2002 | Deryugin et al. |
| 6,389,007 B1 | 5/2002 | Shenkman et al. |
| 6,393,015 B1 | 5/2002 | Shtivelman |
| 6,466,664 B1 * | 10/2002 | Zhao ..................... 379/266.08 |
| 6,732,156 B2 | 5/2004 | Miloslavsky |
| 6,798,876 B1 * | 9/2004 | Bala ...................... 379/265.12 |
| 6,804,346 B1 * | 10/2004 | Mewhinney ............. 379/265.1 |
| 7,023,979 B1 * | 4/2006 | Wu et al. ............... 379/265.11 |

* cited by examiner

SYSTEM AND METHOD FOR OPTIMIZING CALL ROUTING TO AN AGENT

FIELD OF THE INVENTION

The present invention relates generally to a system and method for scheduling inbound and outbound calls in a transaction processing system and/or an automatic call distribution system ("ACD").

BACKGROUND

Systems which automatically distribute customer contacts or calls (generically referred to as "ACD") are often employed in telemarketing environments in which agents at agent stations answer many different types of calls including telephone calls and other types of customer contacts (e.g., VoIP, emails, facsimile, chat room dialog, instant messages, other Internet contacts, etc.) from customers during a work day. As referred to herein, an ACD may be referred to as an automatic call distributor or an automatic contact distributor because the ACD handles a variety of communication media. In other words, the ACD handles many forms of communication, not just telephone calls in which a potential customer speaks with an agent. The term "ACD" may apply to any type of transaction processing system, and need not apply only to dedicated telemarketing systems or automatic call distributors. In some known ACD's, the agent may receive certain information about the type of customer call (i.e. contact) on a visual display at the agent set when a call or contact is distributed to the agent. An ACD may be any such system which performs these functions and, for example, may employ a wide variety of architectures, including integrated centralized systems, distributed systems, systems using one or more personal computers or servers, etc.

In some embodiments, ACD's may be used to support a number of different vendors in their telemarketing effort, and in such marketing environments, the agent is typically in communication with the customer or potential customer with respect to or on behalf of a particular vendor. The next call or contact that the agent processes may be on behalf of the same vendor or on behalf of a different vendor. In another embodiment, ACD's may be used exclusively by or on behalf of a single vendor such that all of the contacts processed by the agent involve one particular vendor.

Often, a customer call is distributed to an agent that involves interactive voice dialog. This means a normal two-way verbal exchange. An ACD, however, may also distribute a non-voice dialog contact or call to the agent. This does not involve direct two-way speech between the agent and the customer or caller. Non-voice dialog communication may be, for example, emails, facsimile, chat room dialog, instant messaging, Internet, etc. and the like. This is becoming more common as Internet traffic and electronic sales transactions increase. Handling the non-voice dialog contact may require a specialized device or subcomponent of the ACD. In this situation, the agent may typically view text on a display screen that the caller typed in or transmitted. In response, the agent may provide information to the contact or request information from the caller via the keyboard or other input device. Essentially, the dialog between the agent and the caller occurs on a display screen. Further, the agent may handle multiple calls. For example, the agent may typically handle two to five (or more) simultaneous non-voice dialog communications or transactions, which may be presented as two to five separate dialog windows on the display screen, which windows may, for example, be tiled or layered. Of course, the number of simultaneous transactions may vary significantly.

The rate at which agents handle calls, and hence the number of calls handled by an agent, may have an impact on the call center efficiency and economic viability of the facility utilizing the ACD. Of course, the quality and content of the call transaction is important, but strictly from the perspective of call handling volume, known systems do not optimize calls directed to the agents based on an agent's predicted availability. Further, known systems do not account for the mix of inbound and outbound calls routed to an agent.

A need exists to permit inbound and outbound call schedules to be optimized so that an agent may handle a maximum number of transactions.

SUMMARY

Disadvantages of transaction processing systems are substantially overcome by providing a novel system and method for optimizing the workload of an agent of the transaction processing system. More specifically, one embodiment is a method for optimizing a workload of an agent of the transaction processing system, where the agent handles inbound and outbound calls, and the calls are based on voice-dialog communication and/or text-dialog communication. The method includes obtaining historical data from a database based on a category of a current call handled by the agent, where the historical data provides an indication of an expected duration of the call, and determining a predicted end time of the current call. If an inbound call is pending, the inbound call is routed to the agent after the current call terminates. If an inbound call is not pending, an outbound call number may be obtained from a list of outbound call numbers to be placed, the outbound call may be placed a determined amount of time prior to the predicted end time of the current call, and the outbound call is routed to the agent.

BRIEF DESCRIPTION OF THE DRAWINGS

The features of the present invention which are believed to be novel are set forth with particularity in the appended claims. The invention, together with further objects and advantages thereof, may best be understood by reference to the following description in conjunction with the accompanying drawings.

DETAILED DESCRIPTION

In this written description, the use of the disjunctive is intended to include the conjunctive. The use of definite or indefinite articles in not intended to indicate cardinality. In particular, a reference to "the" object or thing or "an" object or "a" thing is intended to also describe a plurality of such objects or things.

Figure 1:
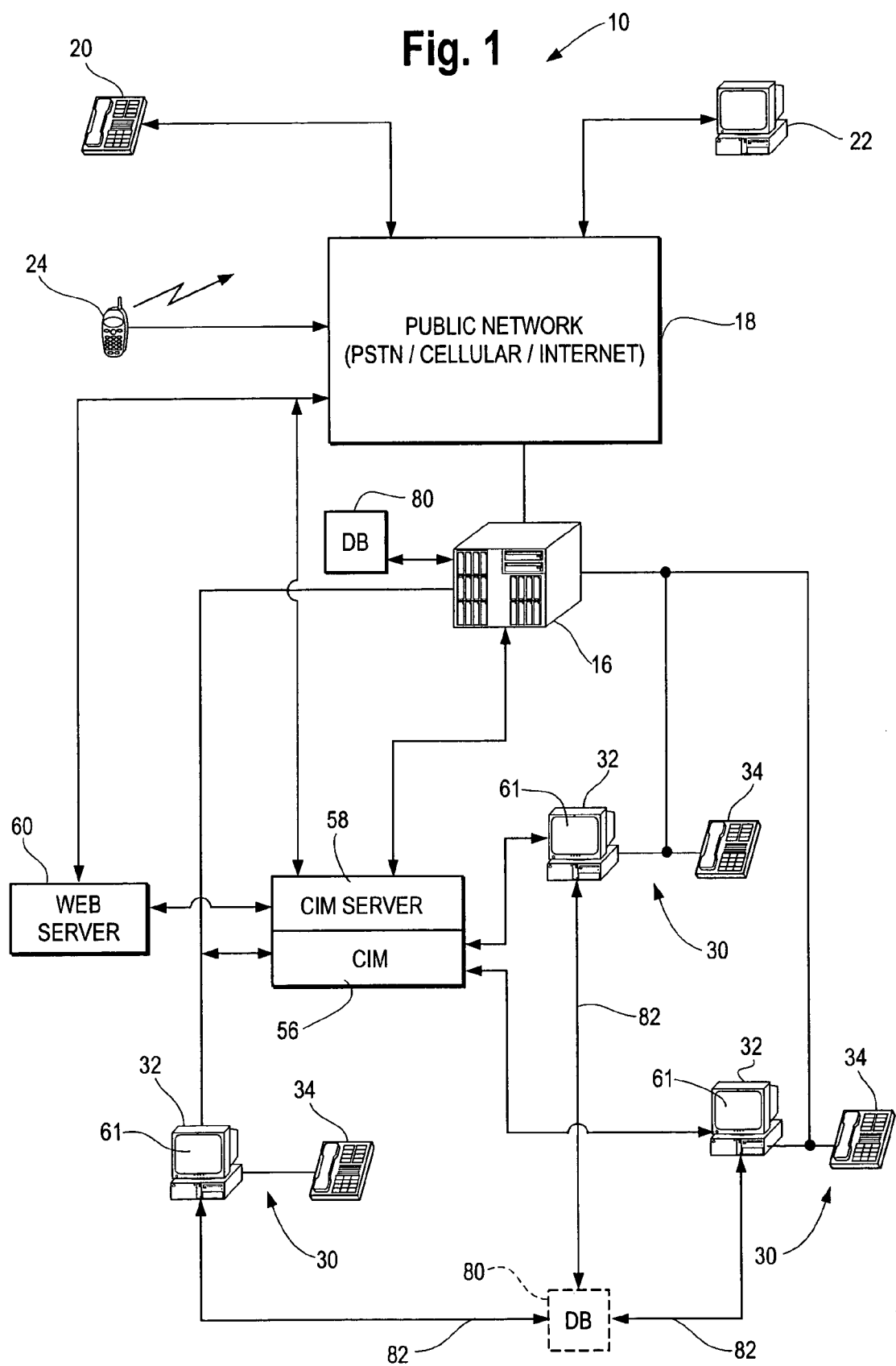
FIG. 1 is a representation of a specific embodiment of a transaction processing system.

Referring now to FIG. 1, an exemplary embodiment of a system 10 for facilitating routing of incoming calls or contacts ("transactions") to agents associated with a transaction processing system, which may also be referred to as an automatic call distributor or automatic contact distribution system (ACD) 16, is shown generally. The ACD 16 processes both voice-dialog communications or transactions, as well as non-voice dialog communications and transactions, as described hereinafter. The present invention may be implemented in numerous types and sizes of systems for distributing calls to selected ones of a plurality of agents. Examples of ACD systems that may be used in the present invention are the SPECTRUM ACD and Transcend ACD products available from Rockwell FirstPoint Contact.

Other types of call distribution systems including, for example, distribution systems or those using one or more personal computers or servers, may also be used. Some other suitable ACD's are disclosed in U.S. Pat. No. 5,268,903, issued to Jones et al. on Dec. 7, 1993, entitled "Multichannel Telephonic Switching Network With Different Signaling Formats and Connect/PBX Treatment Selectable For Each Channel," U.S. Pat. No. 5,140,611, issued to Jones et al. on Aug. 18, 1992, entitled "Pulse width Modulated Self-Clocking and Self-Synchronizing Data Transmission and Method for a Telephonic Communication Switching System," U.S. Pat. No. 5,127,004, issued to Lenihan et al. on Jun. 30, 1992, entitled "Tone and Announcement Message Code Generator for a Telephonic Switching System and Method," U.S. Pat. No. 6,289,373 B1, issued to Dezonno on Sep. 11, 2001, entitled "Method of Processing E-Mail in an Automatic Call Distributor," and U.S. Pat. No. 6,097,806, issued to Baker et al. on Aug. 1, 2000, entitled "ACD with Multi-Lingual Agent Position," the disclosures of which are hereby incorporated by reference in their entirety.

A customer or caller may be connected to the ACD 16 through a public switched telephone network (PSTN) 18, which caller may connect to the PSTN through a standard telephone set 20, a computer 22, a cellular telephone 24, or any suitable communication device. Note that the term "caller" as used herein does not necessarily mean that the contact or person using the telephone 20, for example, initiated the call to the agent. Notably, the agent or system may have initiated the call to the contact. Accordingly, the term "caller" shall broadly refer to the contact or potential customer even though the agent may have originated or initiated the call or contact. Additionally, the term "call" may be a telephone call, or it may be any other form of communication (e.g. emails etc.) as set forth above.

In the illustrated embodiment, multiple agent stations or terminals 30 are shown coupled to the ACD 16. For purposes of illustration, only three agent stations are shown, but any suitable number of agents may be coupled to the ACD 16. The agent stations 30 may also include agent station computers 32 or terminals, and/or telephone sets 34.

Figure 2:
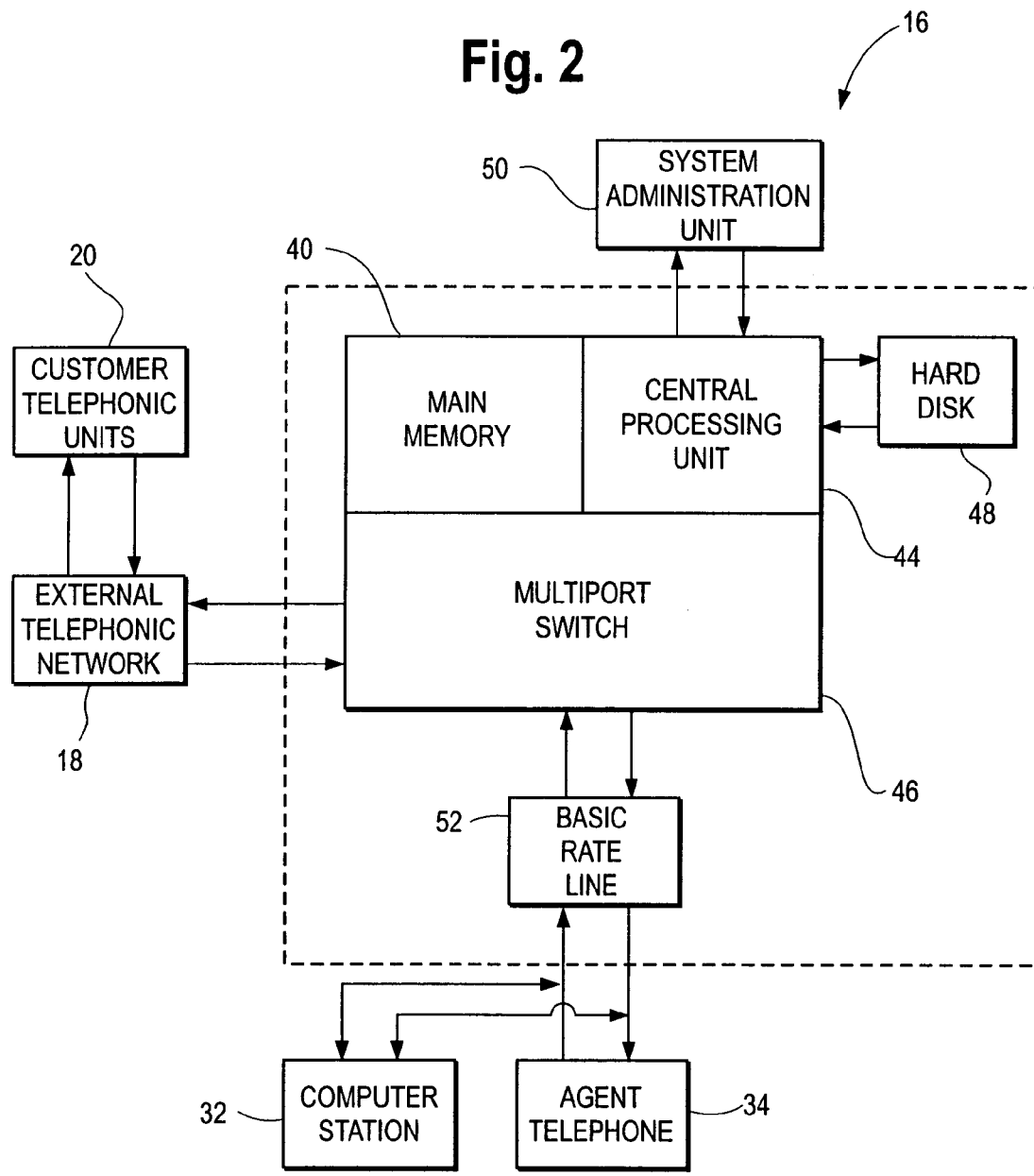
FIG. 2 is a functional block diagram of a specific example of a transaction processing system.

Referring now to FIGS. 1 and 2, FIG. 2 shows an example of an ACD 16 in greater detail. The ACD 16 may comprise hardware and/or software and, for example, may include a main memory 40, a central processing unit 44 and a multiport switch 46, each of which may be separate units, distributed components, or integrated at a single location or single cabinet. The multiport switch 46 may be coupled to the PSTN 18, which in turn, may be connected to customer telephones 20 or other communication devices (20, 22, or 24). The central processing unit 44 may include storage, such as hard disk storage 48, and may also be coupled to a system administration unit 50. The ACD 16 may be connected through a suitable communication link to the plurality of agent telephonic sets 34, for example, through a basic rate line 52, as is known in the art. The agent computer station 32 and the agent telephone sets 34 may be incorporated into a single unit, as is known in the art.

The illustrated ACD 16 may handle voice communication and may also handle non-voice communication, such as emails, facsimile, chat room dialog, instant messaging, Internet, etc. Non-voice dialog communication is another form of contact communication and the ACD 16, when configured and coupled to appropriate hardware and/or software devices, as described below, is not limited to processing voice-based telephone calls. The ACD 16 may be a single integrated device, or may include distributed hardware and software. In one specific embodiment, the SPECTRUM ACD product available from Rockwell FirstPoint Contact may include a non-voice dialog communication processor, such as a Contact Integration Manager (CIM) 56, which may, for example, be a CIM Release No. 1.1, which is also available from Rockwell FirstPoint Contact. In the specific embodiment shown, the communication processor 56 or CIM (also referred to as non-voice dialog communication processor or communication processor) may handle the non-voice dialog communication between the customer or caller, and the agent.

The communication processor 56 may be operatively coupled to the ACD 16 and to the agent computer 32 or agent stations 30. In the illustrated embodiment of FIG. 1, the communication processor 56 typically receives email, chat room dialog, facsimile, instant message, Internet communication, and the like from a communication processor server 58. The communication processor server 58, in turn, may receive additional non-voice dialog contact communication from a web server 60, which may be connected to the PSTN 18 or some other communication network, as is known in the art. In one specific embodiment, the communication processor 56 may be separate from the ACD 16 and operatively coupled to the ACD 16. Alternatively, the communication processor 56 may be integrated into a portion of the ACD 16 or any other processor or processors in the system 10. In another embodiment, at least a portion of the communication processor 56 functionality may be part of the agent station computer 32, which may be, for example, a personal computer. The communication processor 56 may be any suitable computing device, such as, for example a microprocessor, RISC processor, mainframe computer, work station, single-chip computer, distributed processor, server, controller, micro-controller, discrete logic computer, remote computer, personal computer, internet computer, web computer, and the like.

With respect to the apparatus and method described herein, the term ACD 16 may be used interchangeably to mean either the ACD and/or the communication processor 56, or a combination of both. Both terms relate to a "transaction processing system" and because the ACD 16 and the communication processor 56 may be so closely related or their functions so distributed that a meaningful distinction may not be able to be made with respect to which particular component is performing a specific action described. Accordingly, for purposes of illustration only, the below-described method will be described in terms of the ACD 16 performing the step or the communication processor 56 performing the step, even though a separate component or subcomponent, such as the other of above-mentioned components, may perform the step or process.

The communication processor 56 in the illustrated embodiment may be configured to facilitate sending and receiving non-voice dialog communication between the caller and the agent or agent terminal 30, and to transmit a signal to the ACD 16 indicating that the communication processor received the non-voice dialog communication from the caller. The signal from the communication processor 56 to the ACD 16 may create a "call appearance" so that the ACD may be brought into the communication "loop," and is able to track the contact. In one embodiment, the call appearance may simulate to the ACD 16 the appearance of a voice-type call, even though a voice-type call is not present. Once the call appearance to the ACD 16 has been made, the ACD may queue and track the non-voice dialog communication to the appropriate agent as if the call were an ordinary interactive voice-dialog call, even though the ACD may not utilize or connect its voice channel to the agent. For example, the communication processor 56 may handle the non-voice dialog communication and provide the call to the agent, and also may inform the ACD 16 regarding the status and initiation of the call.

Accordingly, once the call appearance has been made, the ACD 16 in the illustrated embodiment of FIG. 1 may select a particular agent to receive the non-voice dialog communication from the communication processor 56, and then may cause the non-voice dialog communication to be routed to the selected agent. The transaction processing system 16 of the illustrated embodiment of FIG. 1 preferably routes voice dialog communication to a selected agent station 30 for servicing by an associated agent using the agent telephone 34 or headset. In conjunction with the communication processor 56, the transaction processing system 16 may, for example, route non-voice dialog or text-based communication to the selected agent station. Again, as set forth above, the communication processor 56 need not be separate or apart from the transaction processing system 16, and may be operatively incorporated into the transaction processing system.

In known ACD systems, when such a call or contact is routed to an agent, the system may notify the agent that a call has arrived, by means known in the art. For example, a message may appear on the agent station 30 and/or an audible signal may be sent to the agent. If the incoming call is a voice dialog communication, the agent speaks with the caller. If the incoming call is a text-based communication, the agent may, for example, communicate with the caller by reading and typing messages on the agent station 30 or agent computer.

The ACD or transaction processing system 16 preferably routes voice dialog communication to the selected agent station 30 for servicing by an associated agent using the agent telephone 34 or headset. In conjunction with the communication processor 56, the transaction processing system 16 may, for example, route non-voice dialog or text-based communication to the selected agent station. Again, as set forth above, the communication processor 56 need not be separate or apart from the transaction processing system 16 and may be operatively incorporated into the transaction processing system. In operation, the transaction processing system 16 and/or the communication processor 56 may route incoming calls from the callers to the agents, where the incoming calls may be routed from the callers over the PSTN 18 or other suitable communication network. The incoming calls may be voice dialog communication or non-voice dialog communication, such as VoIP (voice-over Internet protocol), email, facsimile, chat room dialog, instant messages, and other Internet contacts, as mentioned above.

In one embodiment, the workload of an agent of the transaction processing system 16 may be optimized by routing both inbound and outbound contacts to the agent. This may be done for both synchronous, asynchronous, and pseudo-synchronous contacts. Certain transactions are synchronous in nature, such as voice and video transactions. The transaction is begun, dialog ensues, and typically, the transaction is completed, all during one continuous transmission session. Other types of transactions, such as asynchronous transactions, include email, chat, web access or other text based media. A transmission may begin, for example, with an email, and several emails may be exchanged over a period of minutes, hours or days, before the transaction is completed. Pseudo-asynchronous transmissions include instant messaging and whiteboard messaging, which are still asynchronous in nature, but are typically completed within a short period of time, but not necessarily so.

In some known transaction processing systems, a contact or call may be routed to an agent when the agent is available. Typically, in such known systems, an inbound call is routed to an agent merely depending upon the agent's call volume and how long the agent has been idle. However, this may be inefficient and unproductive. As described herein, it is advantageous to schedule the routing of both incoming or inbound calls, and outgoing or outbound calls to an agent depending upon the "expected" availability of the agent. An agent's expected availability may be predicted, for example, based upon an expected duration of the agent's current call or contact. In one specific embodiment, inbound calls may take priority over outbound calls so that the inbound caller, who presumably has a specific goal or task in mind, may be accommodated quickly.

According to one specific embodiment, historical data may be obtained from a database 80 based on a category of a current call handled by the agent. The historical data may provide an indication of an expected duration of the call. Once the expected duration is known, the predicted end time of the current call may be calculated. For example, the predicted end time may be calculated by adding a start time of the call or contact to the expected duration. Of course, this means that the start time of each call is recorded, which start time may be recorded, for example, in the database or in a "scratchpad" memory of the main memory 40. Any suitable means for tracking the start time of a call may be used, and such information need not be necessarily stored in memory.

Note that as used herein, the term "historical data" need not necessarily mean that the data was previously collected or obtained from real-world occurrences. For example, such "historical data" may be ascertained from formula or may be assigned default values. Any suitable method of obtaining, calculating, or ascertaining the "historical data" may be used.

In one specific embodiment, if an inbound call is pending it may be routed to the agent at the predicted end time of the call. This embodiment, if the predicted end time is not precise, the caller may be left "hanging" until the agent actually completes the current call. Preferably, according to another specific embodiment, the incoming call may be routed to the agent only if the agent is available. A record may be maintained that tracks the differences in the predicted end time of the call compared to the actual end time of the call. This may be used to "fine tune" the predicted end time to improve the predictive accuracy. For example, perhaps a particular type of call, for instance, a call concerning purchase of a computer, is consistently two minutes longer than the predicted end time for a call of that nature. In that case, the historical expected duration of the call may be increased by two minutes to more accurately reflect real-world transactions. Such fine tuning may be done automatically, for example, by the system or may be performed manually, for example, by a supervisor.

Other methods and techniques may also be used to fine tune the system. For example, such timing may be based on chronological criteria, such as the time of day, the day of the week, the season, whether a particular day is a holiday and the like. Also, for example, real-world occurrences may be taken into consideration, such as new events, natural disasters, whether conditions and the like.

The expected duration of subject-specific transactions may be established based on historical times for such subject matter. Of course, any single transaction may be less than or greater than an expected duration, but given a sufficient number of transactions, for example fifty transactions, the average time represents a good approximation. Further, as the granularity of the subject matter is increased (i.e., number of different subjects), that is, the different subject matters are broken down into numerous matters so that each transaction within a particular subject matter becomes more homogeneous, the accuracy of the prediction increases.

Information regarding the subject matter of the transaction may be gathered from various sources. Such information may permit the transaction to be categorized according to a particular topic or subject such that apriori expected time durations may be associated with that category or subject matter. In one specific embodiment, an incoming call may include ANI (automatic number identification) fields and/or DNIS (dialed number information service) fields, which may contain specific information corresponding to the incoming call. In one specific embodiment, the ACD 16 or the communication processor 56 may inspect the ANI data to determine the caller's originating calling number. This is also referred to as caller-ID.

Once the caller's originating number is ascertained, the originating number may be used to access the database 80. The originating number may be used directly as a pointer into the database 80 or may be manipulated to conform to a suitable indexing standard, as may be defined by the database. Any suitable database 80 or memory system may be used, which database or memory, for example, may be incorporated or distributed within the ACD system 16, the communication processor 56, or the agent station 30. It may also be remotely located from the above-mentioned components and may be connected thereto by a local area network (LAN) or other communication link 82. Note that for purposes of clarity only, the database 80 is also shown in dashed lines coupled to each of the three agent stations via a LAN.

Figure 3:
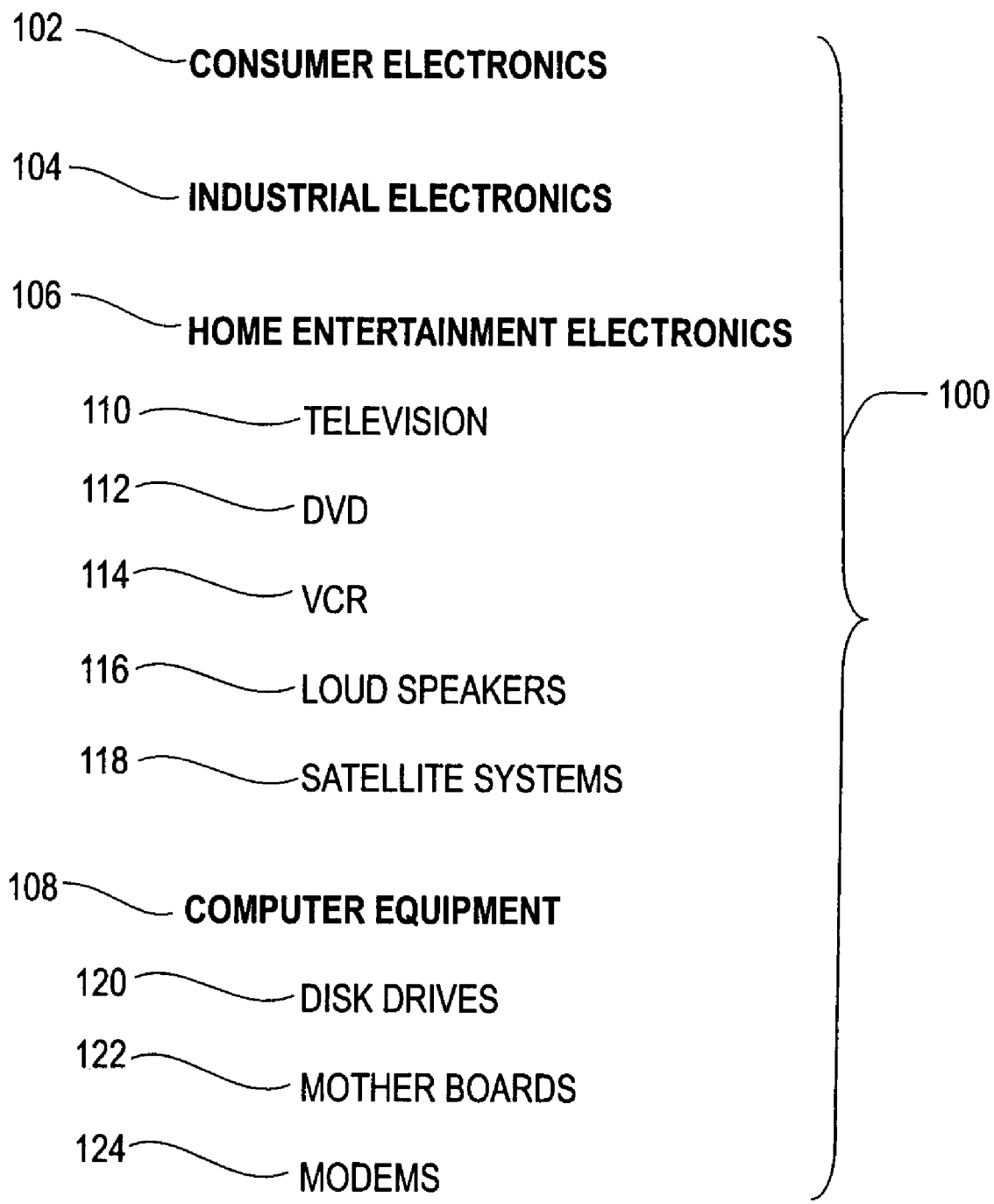
FIG. 3 is a representation of menu driven selection presented to a caller.

Alternatively, using the DNIS information, the number that the caller dialed may be used to ascertain the category or subject matter of the transaction. For example, as shown in FIG. 3, the caller may be asked to depress certain digits in response to a pre-recorded announcement, where the digits represent selections within a menu 100. Each menu selection may correspond to a particular dialed number (preferably an 800 number) such that the dialed number may identify the category or subject matter. For example, the first item selected by the caller may correspond to one of the following subjects: consumer electronics 102, industrial electronics 104, home entertainment electronics 106, computer equipment 108 and the like. If the caller selects "home entertainment electronics," 106 the caller may be further prompted to select one of the following topics: television 110, DVD 112, VCR 114, loud speakers 116, satellite systems 118 and the like. If however, the caller selected "computer equipment," 108 the following choices may be made available: disk drives 120, motherboards 122, modems 124. Any number of possible categories or subjects may be available.

The greater the number of subjects or menu entries, the narrower the selected subject matter becomes. When the caller as entered all requested information, the caller may then be routed to an agent as described herein in accordance with the selections made. As is known, the final selected category or subject matter may cause the caller to be routed to a specific department or group of agents who presumably may have expertise in that area. Thus, the DNIS data corresponding to the dialed number or department may represent or may be equivalent to the category or subject matter. Thus, an expected call duration may be associated with each such category.

In another specific embodiment, the data resident in the database 80 concerning a caller may also provide useful information with respect to an expected duration of the transaction, assuming of course, that the caller has a prior calling history. Of course, if the caller is a first time caller, a new entry may be made in the database 80 regarding the caller and the substance of the transaction. For example, perhaps a particular caller always calls with reference to a computer component, for example, a disk drive component. Because the database contains a history of this individual's transactions, including the duration of previous transactions, a new transaction regarding the same category or subject matter is likely to be about the same duration as previous transactions. Of course, this cannot be predicted with exact certainty, but over time and over a large sample of transactions, the accuracy of such predictions tends to increase.

In another specific embodiment, to more completely fill the agent's schedule, if there are no inbound calls pending or if the agent is scheduled to handle an outbound call regardless of the status of pending inbound calls, an outbound call number may be obtained from a list of outbound call numbers to be dialed or "placed." The list of outbound call numbers may be stored in memory or the database 80. As mentioned immediately above, outbound calls may be routed to the agent, if no inbound calls are pending. This is referred to as an "inbound-preferred schedule" because inbound calls are given priority.

However, the transaction processing system 16 need not follow such a schedule. For example, an inbound/outbound work schedule may be stored in a memory of the transaction processing system 16 or in an entry in the database 80 corresponding to a specific agent profile. The inbound/outbound work schedule may govern the "mix" or percentage of inbound and outbound calls to be routed to the agent. The inbound/outbound schedule may govern the percentage of inbound calls that may be routed to an agent in a given time period, for example, one working day. When such a percentage of inbound calls have been exceeded, no further inbound calls may be routed to that agent. Instead, only outbound calls are then routed to that agent. Once the balance has been restored in accordance with the inbound/outbound schedule, inbound calls may then again be routed to the agent. This may prevent an agent from being "loaded" with only inbound calls.

In another specific embodiment, an outbound call may be placed a determined amount of time prior to the predicted end time of the current call. Note that such "determined" amount of time may be a "predetermined" amount of time. Initiating the outbound call before the agent is actually available may save time as described below. For example, assume that an agent requires an average of five minutes to service a transaction involving "computer equipment." In accordance with this embodiment, the transaction processing system may place the next outbound call or contact about thirty seconds prior to the predicted end of the agent's current transaction.

This may be referred to as "pre-dialing" in synchronous types of transactions because a telephone number is dialed. The transaction processing system may automatically pre-dial the next telephone number in a list under the assumption that the agent will be free to service the new call as soon as the outbound call is answered by the party to whom it was placed. This may also be performed with asynchronous and pseudo-synchronous transaction, but the "pre-dialing" term may be, for example, referred to a "pre-placing" time because an actual telephone number may not be dialed. Further, such pre-placing time may be less than the typical "pre-dialing" time. Thus, the term "pre-dialing" may be used interchangeably with the term "pre-placing" depending upon whether the context is synchronous translations (i.e. conventional telephonically dialed number) or asynchronous/pseudo-synchronous transactions (i.e. chat, e-mail, fax, instant message, or any IP-type communication). The term conveys the concept that a call or contact is placed to a party.

With respect to synchronous transactions for example, pre-dialing may save valuable time in several ways. When an agent dials a telephone number manually, the amount of time required to dial the number may be perhaps six to twelve seconds. Of course, automatically dialed numbers still require some amount of time to dial, but presumably less time than a manually dialed number. Next, there may be an average of three ring cycles before the party answers. Because each ring cycle requires about six seconds, about eighteen seconds on average is used during the ring cycles. Thus, perhaps thirty seconds of time may be wasted by dialing and waiting for the call to connect. Over time, such thirty second time intervals represent a significant amount of wasted time in a transaction processing center 16. Further, perhaps one-third of the calls placed are either busy, do not answer, or an answering machine responds. Such occurrences represent even a greater waste of time. In accordance with the present invention, such calls are not dealt with by the agent. Hence, no time is wasted on such unproductive calls. In accordance with the embodiments herein, pre-dialing or pre-placing the calls cumulatively saves a significant amount of time with respect to agent time scheduling, thus making the agent more efficient than is otherwise possible.

Of course, such pre-dialing or pre-placing may not always function exactly as desired, and the transaction processing system 16 may "overdial" the telephone numbers. When this happens, the transaction processing system 16 may call a new outbound telephone number, the outbound call may be answered, but no agent may be available to be connected to that call because the agent may be involved in a transaction that required a longer amount of time than was predicted. Thus, the answering party may be connected to "idle," which may be music, a recorded announcement, and the like. The person answering the call may, of course, be annoyed. However, such over-dialing may be minimized by optimizing the calculation for the expected call duration, the accuracy of which may increase as the quality and quantity of historic information governing such calculations increase over time.

With respect to asynchronous and pseudo-synchronous transactions as described above, such transactions may have several portions or distinct communication segments. In one specific embodiment, a first or initial portion of an inbound call or contact may require more of the agent's time than subsequent communications pertaining to the same call or contact. For example, a first email in an asynchronous communication may be the most lengthy portion because most of the customer data and product information may need to be gathered and discussed. A subsequent email to complete the transaction, for example, involving the receipt of credit card information to close the transaction, may require less time than the first portion of the transaction, although not necessarily so. Empirical data on such transactions may further establish a calling pattern and expected duration times, as described above.

However, the above may vary depending upon the nature or category of the transaction, and whether the call or contact is inbound or outbound. For example, in an outbound asynchronous or pseudo-synchronous call or contact, it is likely that the first portion of the call or contact initiated by the agent is very short because the agent is perhaps making an unsolicited telemarketing call. The second portion of the call or contact, which would normally be the response from the contacted party, would most likely take longer to handle because questions posed by the party originally contacted may need to be handled by the agent. Again, empirical data may be used to increase the accuracy of such determinations. In either of the above-described situations, the expected duration of each portion of the call or contact is determined so that the agent's future availability may be more accurately ascertained.

Specific embodiments of a system and method for optimizing call routing to an agent according to the present invention have been described for the purpose of illustrating the manner in which the invention may be made and used. It should be understood that implementation of other variations and modifications of the invention and its various aspects will be apparent to those skilled in the art, and that the invention is not limited by the specific embodiments described. It is therefore contemplated to cover by the present invention any and all modifications, variations, or equivalents that fall within the true spirit and scope of the basic underlying principles disclosed and claimed herein.

What is claimed is:

1. In a transaction processing system, a method for optimizing a workload of an agent of the transaction processing system, the agent handling inbound and outbound calls, the calls based on voice-dialog communication and/or text-dialog communication, the method comprising:
   obtaining data from a database based on a category of a current call handled by the agent, the data providing an indication of an expected duration of the call;
   determining a predicted end time of the current call;
   placing the outbound call a determined amount of time prior to the predicted end time of the current call; and
   routing the outbound call to the agent for servicing.

2. The method according to claim 1 wherein if an inbound call is pending, the inbound call is routed to the agent after the current call terminates, and if an inbound call is not pending, an outbound call number is obtained from a list of outbound call numbers to be placed.

3. The method according to claim 1 wherein the category is derived from a subject matter of the call.

4. The method according to claim 1 wherein the category is derived from information contained in a DNIS or an ANI field associated with an inbound call.

5. The method according to claim 1 wherein for an inbound call, the category is derived from information provided by a caller.

6. The method according to claim 1 wherein for an outbound call, the category is derived from known average handling time for a subject matter of the outbound call.

7. The method according to claim 1 wherein a start time for each outbound and inbound call is stored.

8. The method according to claim 7 wherein the predicted end time is calculated by summing the start time and the expected duration.

9. The method according to claim 1 wherein the outbound calls substantially fill time gaps in the agent's work schedule to maximize a number of transactions handled by the agent.

10. The method according to claim 1 wherein the text-dialog communication is an asynchronous communication and includes at least a first call portion and a second call portion, the first and second call portions separated by a period of time.

11. The method according to claim 10 wherein the expected duration of the first call portion is greater than the expected duration of the second call portion.

12. The method according to claim 10 wherein the expected duration of the first call portion is less than the expected duration of the second call portion.

13. The method according to claim 1 wherein the inbound call is routed to the agent only if the agent is scheduled to receive additional inbound calls.

14. The method according to claim 13 wherein an agent schedule allocates first percentage of calls to route to the agent as inbound calls, and a second percentage of calls to route to the agent as outbound calls.

15. The method according to claim 14 wherein no inbound calls are routed to the agent if the number of inbound calls routed to the agent exceeds the first percentage.

16. The method according to claim 1 wherein the data is historical data.

17. In a transaction processing system, a method for optimizing inbound and outbound calls routed to an agent of the transaction processing system, the calls based on voice-dialog communication and/or text-dialog communication, the method comprising:
   obtaining data from a database based on a category of a current call handled by the agent, the data providing an indication of an expected duration of the call;
   determining a predicted end time of the current call;
   if an inbound call is pending, and if in accordance with an inbound/outbound call schedule, routing the inbound call to the agent after the current call terminates; and
   if an inbound call is not pending, and if in accordance with the inbound/outbound call schedule:
      obtaining an outbound call number from a list of outbound call numbers to be placed;
      placing the outbound call a determined amount of time prior to the predicted end time of the current call; and
      routing the outbound call to the agent.

18. The method according to claim 17 wherein the category is derived from a subject matter of the call.

19. The method according to claim 17 wherein for an outbound call, the category is derived from known average handling time for a subject matter of the outbound call.

20. The method according to claim 17 wherein the outbound calls substantially fill time gaps in the agent's work schedule to maximize a number of transactions handled by the agent.

21. The method according to claim 17 wherein the text-dialog communication is an asynchronous communication and includes at least a first call portion and a second call portion, the first and second call portions separated by a period of time.

22. The method according to claim 17 wherein the inbound call is routed to the agent only if the agent is scheduled to receive additional inbound calls.

23. A transaction processing system configured to optimize a workload of an agent of the transaction processing system, the agent handling inbound and outbound calls, the calls based on voice-dialog communication and/or text-dialog communication, the system comprising:
   a communication processor configured to facilitate sending and receiving the voice-mode communication and/or the text-mode communications;
   a plurality of agent terminals operatively coupled to the communication processor, each agent terminal having a display screen for displaying data;
   a database having historical data based on a category of a current call handled by the agent, the historical data providing an indication of an expected duration of the call to facilitate determining a predicted end time of the current call; and
   wherein if an inbound call is pending, the inbound call is routed to the agent after the current call terminates, and if an inbound call is not pending, an outbound call number is obtained from a list of outbound call numbers to be placed such that the outbound call is placed a determined amount of time prior to the predicted end time of the current call, and is routed to the agent.

24. The system according to claim 23 wherein the category is derived from a subject matter of the call.

25. The system according to claim 23 wherein for an outbound call, the category is derived from known average handling time for a subject matter of the outbound call.

26. The system according to claim 23 wherein the outbound calls substantially fill time gaps in the agent's work schedule to maximize a number of transactions handled by the agent.

27. The system according to claim 23 wherein the text-dialog communication is an asynchronous communication and includes at least a first call portion and a second call portion, the first and second call portions separated by a period of time.

28. The system according to claim 23 wherein the inbound call is routed to the agent only if the agent is scheduled to receive additional inbound calls.

29. A transaction processing system configured to optimize a workload of an agent of the transaction processing system, the agent handling inbound and outbound calls, the calls based on voice-dialog communication and/or text-dialog communication, the system comprising:
   means for processing operative to facilitate sending and receiving the voice-mode communication and/or the text-mode communications;
   a plurality of agent terminals operatively coupled to the means for processing, each agent terminal having a display screen for displaying data;
   means for determining a predicted end time of the current call; and
   wherein if an inbound call is pending, the inbound call is routed to the agent after the current call terminates, and if an inbound call is not pending, an outbound call number is obtained from a list of outbound call numbers to be placed such that the outbound call is placed a determined amount of time prior to the predicted end time of the current call, and is routed to the agent.

30. The method according to claim 29 wherein the outbound calls substantially fill time gaps in the agent's work schedule to maximize a number of transactions handled by the agent.

31. The method according to claim 29 wherein the text-dialog communication is an asynchronous communication and includes at least a first call portion and a second call portion, the first and second call portions separated by a period of time.

32. The method according to claim 29 wherein the inbound call is routed to the agent only if the agent is scheduled to receive additional inbound calls.

* * * * *